April 23, 1968 J. H. M. SCHOLTEN 3,380,036

SHIFT REGISTER OF THE KIND COMPOSED OF STORAGE CORES

Filed Nov. 4, 1963

INVENTOR.
JOHANNES H.M. SCHOLTEN
BY
Frank R. Jifani
AGENT

United States Patent Office 3,380,036

Patented Apr. 23, 1968

3,380,036

SHIFT REGISTER OF THE KIND COMPOSED OF STORAGE CORES

Johannes Hermanus Maria Scholten, Emmasingel, Eindhoven, Netherlands, assignor to North American Philips Company, Inc., New York, N.Y., a corporation of Delaware Filed Nov. 4, 1963, Ser. No. 321,700
Claims priority, application Netherlands, Nov. 2, 1962, 285,016
5 Claims. (Cl. 340—174)

ABSTRACT OF THE DISCLOSURE

A shift register composed of magnetic cores wherein information is transferred from a first core to an adjacent core by generating in the first core a magnetic field one and one half times that necessary to reset the core, simultaneously generating in the adjacent core a magnetic field of one half the magnitude necessary to set the adjacent core, sensing the state change of the first core in a winding common to both cores and generating in the common winding by the use of a blocking oscillator a field which when added to the field initially generated in the adjacent core changes the state of that core.

The invention relates to a shift register composed of preferably annular storage cores of a material having a rectangular hysteresis loop. A first wire connected to a first current pulse source is threaded through each pair of consecutive cores so that upon triggering the current source a magneto-motive force will be produced in the first of the two cores. This force drives the first core into the 0 state has a sufficient magnitude to change this core from the 1 state to the 0 state. In the second of the two cores a magneto-motive force driving it into the 1 state is provided, which force has approximately half of the magnitude of the magneto-motive force just capable of switching this core from the 0 state into the 1 state. A second wire, connected to a second current pulse source is threaded, in addition, through said two cores. Such a shift register is known inter alia from German Patent 1,018,656. The present invention has for its object to further simplify the structure described in the German patent. Shift registers are important parts of electronic computers and, especially with table or desk computers it is important to provide the simplest possible shift registers. Such simplicity may be achieved, if necessary, at the expense of speed, since speed plays a considerably minor role with table computers than with the so-called general-purpose computers. It is known that a shift register of the Wang-line type (see "Journal of Appl. Physics" Vol. 21, (1950), pages 49–54 "A static magnetic storage and Delay-line" by An Wang and Way Dong Woo) can be reduced to approximately half the length, when the signal stored in such a register is not shifted simultaneously for all bits over one step, but bit after bit. Each time, when the signal stored in a storage core is changed over to the consecutive storage core, a storage core is free, so that afterwards the signal stored in the preceding storage core can be changed over to this free storage core. The invention further develops this idea, and achieves a further simplification of the shift register. In accordance with the invention the second current pulse source is triggered by the pulse induced into the second wire when the first of the two cores changes over from the 1 state into the 0 state. The source then supplies a current pulse of a strength such that in the two cores a magneto-motive force driving it into the 1 state is produced which has approximately half of the magnitude of the magneto-motive force which can drive said cores just from the 0 state into the 1 state. Furthermore the magneto-motive force produced by triggering the first current pulse source in the first core, said force driving it into the 0 state, has a magnitude such that this core changes over, even when simultaneously a magneto-motive force produced by the triggering of the second current pulse source and driving into the 1 state is available. Instead of providing a value of the magneto-motive force produced by triggering the first current pulse source in the first core and driving it into the 0 state such that this core changes over to the 0 state even when simultaneously a magneto-motive force produced by triggering the second current pulse source and driving into the 1 state is available, as an alternative the duration of the pulses supplied by the first current pulse source may be made sufficiently long with respect to the duration of the pulses supplied by the second pulse source that a pulse supplied by the first pulse source overlaps the thus produced pulse of the second current pulse source to an extent such that the first of the two cores changes over completely from the 1 state into the 0 state.

The invention will be described by way of example with reference to the drawing.

Figure 1:
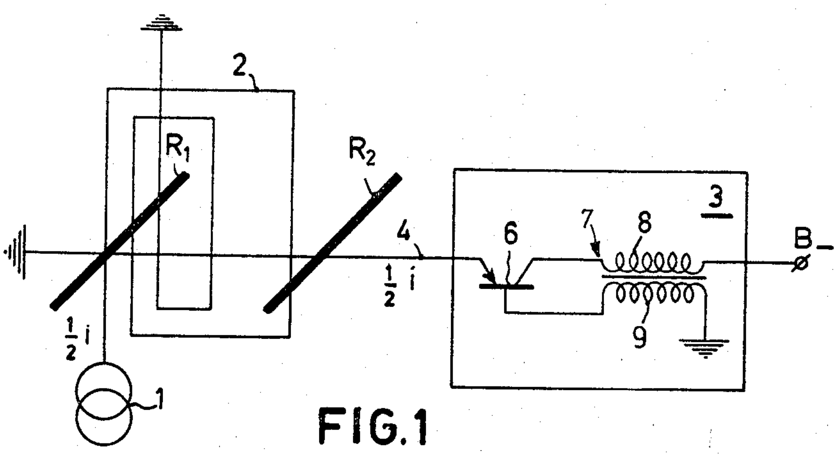
FIG. 1 illustrates the principle of the invention.

Referring to FIG. 1, references $R_1$ and $R_2$ designate two consecutive storage cores of a shift register; 1 denotes a first current pulse source, which, when triggered, supplies a current pulse having a magnitude $\frac{1}{2}i$ in the wire 2 connected thereto; 3 denotes a second current pulse source of the single-pulse generator type (blocking oscillator), which supplies, when triggered, a current pulse of a magnitude $\frac{1}{2}i$ in the wire 4 connected thereto. Here $i$ designates the magnitude of the current pulses by means of which the cores can just be changed over or switched, whereas a current pulse of the strength $\frac{1}{2}i$ is certainly insufficient to this end.

The blocking oscillator 3 comprises a transistor 6 and a transformer 7. The emitter of the transistor 6 is connected to one end of the wire 4, the other end of which is connected to earth. The collector of the transistor 6 is connected via a winding 8 of the transformer 7 to a negative voltage source B—. The base of the transistor 6 is connected via a second winding 9 of the transformer to earth or, if desired, to a low-voltage source. The directions of winding of the two windings of the transformer are such that when the transistor allows a current pulse to pass, since its emitter receives, for example, a positive pulse, the voltage thus induced into the second winding renders the base negative. From the figure it will furthermore be seen that the wire 2 is threaded three times through the core $R_1$ and once through the core $R_2$. The wire 4 is threaded once through each of the two cores $R_1$ and $R_2$.

The arrangement operates as follows. It is supposed that the core $R_1$ is in the 1 state and the core $R_2$ is in the 0 state. The 1 state is supposed to denote the magnetization state, into which the cores $R_1$ and $R_2$ are driven by a current pulse in the wire 4 travelling towards the emitter of the transistor 6. When the current pulse source 1 is triggered, the core $R_1$ receives a current pulse driving it into the 0 state and having a magnitude $\frac{3}{2}i$ and the core $R_2$ receives a current pulse driving it into the 1 state and having a magnitude $\frac{1}{2}i$. The core $R_1$ will therefore start changing over, but the core $R_2$ remains in the 0 state. Owing to the change-over of the core $R_1$, a voltage is induced in the wire 4 which voltage renders the emitter of the transistor 6 positive, so that the transistor becomes conducting. The current thus produced through the winding 8 of the transformer 7 induces a voltage in winding 9 of this transformer, which voltage renders the base of the transistor 6 negative so that the transistor remains conducting at least up to the instant when the core of the transformer attains the saturation point. The components are proportioned so that the current pulse thus produced through the wire 2 has a magnitude $\frac{1}{2}i$. This results in that the core $R_1$ receives from this instant a current pulse driving to the 0 state and having a magnitude $\frac{3}{2}i - \frac{1}{2}i$, so that it continues changing over to the 0 state as long as this state has not yet been reached and that the core $R_2$ receives a current pulse driving to the 1 state and having the strength $\frac{1}{2}i + \frac{1}{2}i = i$, so that it switches from the 0 state to the 1 state. As soon as the core of the transformer 7 is saturated, the negative voltage of the base of the transistor 6 decreases until the transistor becomes finally non-conducting. The core of the transformer 7 then demagnetises, so that the base of the transistor 6 becomes positive and the transistor remains non-conducting for a given period of time, even if a low positive voltage were conducted to the emitter owing to the change-over of the core $R_1$.

It is supposed that the two cores $R_1$ and $R_2$ are in the 0 state. Triggering of the current pulse source 1 does not result in this case in the switching of core $R_1$, so that no pulse is induced in the wire 4 and the transistor remains non-conducting, so that the core $R_2$ does not switch. The two cores thus remain in the 0 state.

In the two cases it can be stated that the core $R_2$ has taken over the signal initially stored in the core $R_1$ and that the core $R_1$ has no signal stored in it. The latter is due to the fact that at the termination of the pulses this core is always in the 0 state, independently of the state which it initially had.

In contrast to FIG. 1 if the wire 2 were threaded twice, instead of three times, through the core $R_1$, the latter would receive, after the transistor 6 had become conducting, not a current pulse driving into the 0 state of a strength $i$, but a current pulse driving into the 0 state of the strength $\frac{1}{2}i$. Then there is the risk of the core $R_1$ not being set completely into the 0 state, but staying in an intermediate position. In the arrangement shown in FIG. 1 this risk is avoided by threading the wire 2 three times through the core $R_1$. A further means of obviating said risk consists in that the duration of the current pulse supplied by the current pulse source 1 is prolonged with respect to the pulse supplied by the single-pulse generator 3 to an extent such that the core $R_1$ is certain to attain the 0 state. After the core of the transformer 7 has reached the saturation point and the transistor 6 has become non-conducting, the core of the transformer 7 starts demagnetising, so that the base of the transistor becomes positive and the transistor remains non-conducting unil the core has completely demagnetised. In the meantime the core $R_1$ has already reached, in general, the 0 state. If this were not the case, the process described above is repeated, the only consequence being that the duration of the pulse supplied by the current pulse source 1 must be further prolonged.

In known manner the arrangement may be rendered less critical for the magnitudes of the current pulses to be supplied by the current pulse source 1 and the single-pulse generator 3 by using a preliminary current driving to the 0 state and having a strength of about $\frac{1}{2}i$.

Figure 2:
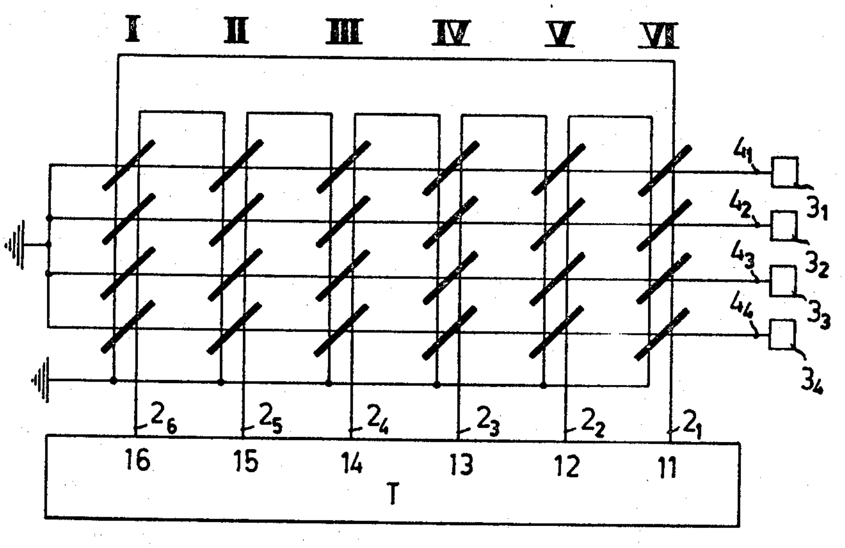
FIG. 2 shows a quadruple shift register according to the invention.

FIG. 2 shows a quadruple shift register in which the principle illustrated in FIG. 1 is employed. This register comprises six columns I, II, III, IV, V, VI of four rings each. The shift register is closed in itself, so that six wires 2 are provided, which are designated in FIG. 2 by $2_1$, $2_2$, $2_3$, $2_4$, $2_5$ and $2_6$. For the sake of simplicity of the drawing, these wires are shown in a state in which they are threaded only once through the cores concerned, but in practice each wire $2_i$ is threaded two or three times (or if desired more times) through a first group of cores and once through a second group of four cores. There are provided in this case four wires 4, designated by $4_1$, $4_2$, $4_3$, $4_4$ and four blocking oscillators 3, designated by $3_1$, $3_2$, $3_3$ and $3_4$. The current pulse source 1 of FIG. 1 corresponds in FIG. 2 to a counting circuit T having six outputs 11, 12, 13, 14, 15, 16. Each of these outputs is connected to a wire $2_i$.

It is supposed that all cores of the column VI are in the 0 state, but that in the cores of the further columns arbitrary signals are stored. When the counting circuit T supplies at its outputs 12, 13, 14, 15 and 16 in order of succession a current pulse of the intensity $\frac{1}{2}i$, first the signals stored in column V are transferred to the column VI, then the signals stored in column IV to the column V, emptied during the preceding transfer, then the signal stored in column III to the column IV emptied during the preceding transfer and so on, until finally the signals stored in the column I are transferred to the column II emptied during the preceding transfer. All signals stored in the quadruple shift register have thus been shifted to the right over one column. If subsequently, the counting circuit T supplies at its outputs 11, 12, 13, 14, 15 a current pulse of the strength $\frac{1}{2}i$, the signals stored in column VI are transferred to column I, the signals stored in column V to column VI and so on until finally the signals stored in column II are transferred to column III. The signals stored in the shift register thus perform a cyclic circulation.

What is claimed is:

1. A shift register comprising $n$ cores constructed of a magnetic material exhibiting square loop magnetic characteristics, means providing $n$ sequential outputs on $n$ output terminal means, $n$ winding means each connected to a different one of said output terminal means and coupled to a different one of said cores for providing a first magneto-motive force of sufficient magnitude to switch the coupled core from a first magnetic state to a second magnetic state, means coupling each of said winding means to each respective core preceding each said coupled core for providing a second magneto-motive force in said preceding core of substantially less than that magnitude necessary to switch said preceding core from the second magnetic state to the first magnetic state, a further winding magnetically coupled to each of said cores and having a voltage induced therein in response to a change of state of a core, and a blocking oscillator coupled to said further winding and responsive to the voltage induced in said further winding by the change of state of a core in response to said first magneto-motive force to provide a current pulse in said further winding, said preceding core being responsive to said current pulse and said second magneto-motive force to switch from a second magnetic state to a first magnetic state.

2. A shift register as set forth in claim 1 in which said feedback means is a saturable core transformer having a primary winding in series with the output electrode and a secondary winding in series with the common electrode.

3. A shift register comprising $n$ cores constructed of a magnetic material exhibiting square loop magnetic characteristics, means providing $n$ sequential outputs on $n$ output terminal means, $n$ winding means each connected to a different one of said output terminal means and coupled to a different one of said cores for providing a first magneto-motive force of sufficient magnitude to switch the coupled core from a first magnetic state to a second magnetic state, means coupling each of said winding means to each respective core preceding each said coupled core for providing a second magneto-motive force in said preceding core of substantially one half that magnitude necessary to switch said preceding core from the second magnetic state to the first magnetic state, a further winding magnetically coupled to each of said cores and having a voltage induced therein in response to a change of state of a core, an energizing source coupled to said further winding for producing a current therein and providing a third magneto-motive force in said preceding core of substantially one half the magnitude necessary to switch said preceding core from the second to the first magnetic state, said second and third magneto-motive forces acting in conjunction to switch said preceding core from said second to said first magnetic state, an amplifier having common, control and output electrodes, said output and common electrodes forming an electrical path having an impedance which varies as a function of bias between said control and common electrodes, means for coupling the voltage induced in said further winding to the common electrode of said amplifier as a forward bias signal, means for coupling said output electrode to said energy source and regenerative feedback means coupling said energy source to said control electrode for maintaining a forward bias for a predetermined duration between said common and said control electrodes in response to the appearance of a voltage induced in said further winding by the reversal of state of a core.

4. A shift register comprising *n* cores constructed of a magnetic material exhibiting square loop magnetic characteristics, means providing *n* sequential outputs on *n* output terminal means, *n* winding means each connected to a different one of said output terminal means and coupled to a different one of said cores for providing a first magneto-motive force of sufficient magnitude to switch the coupled core from a first magnetic state to a second magnetic state, means coupling each of said winding means to each respective core preceding each said coupled core for providing a second magneto-motive force in said preceding core of substantially one half that magnitude necessary to switch said preceding core from the second magnetic state to the first magnetic state, a further winding magnetically coupled to each of said cores and having a voltage induced therein in response to a change of state of a core, an energizing source coupled to said further winding for producing a current therein and providing a magneto-motive force in said further winding of substantially one half the magnitude necessary to switch a core from the second to the first magnetic state, said second and third magneto-motive forces acting in conjunction to switch said preceding core from said second in said first magnetic state, a transistor switch having a first, second and third electrode, said first and second electrode forming an electrical path which becomes conductive in response to forward bias conditions between said first and third electrodes, means for coupling the voltage induced in said further winding to the first electrode of said transistor switch as a forward bias signal, means for coupling said second electrode to said energy source and time limited regenerative feedback means coupling said energy source to said third electrode for maintaining a forward bias of a predetermined duration between said first and said third electrodes in response to the appearance of a voltage induced in said further winding by the reversal of state of a core.

5. A shift register as set forth in claim 4 in which said time limited regenerative feedback means is a saturable core transformer having a primary winding connected in series with the second electrode and a secondary winding connected in series with the third electrode.

References Cited

UNITED STATES PATENTS

| | | | |
|---|---|---|---|
| 2,952,841 | 9/1960 | Lung | 340—174 |
| 3,097,350 | 7/1963 | Coates | 340—174 |
| 3,181,127 | 4/1965 | Merz | 340—174 |

BERNARD KONICK, *Primary Examiner.*

H. D. VOLK, P. SPERBER, *Assistant Examiners.*